Aug. 14, 1923.
M. S. DUNKELBERGER
1,465,211
COLLAPSIBLE BABY CARRIAGE
Filed Feb. 20, 1922
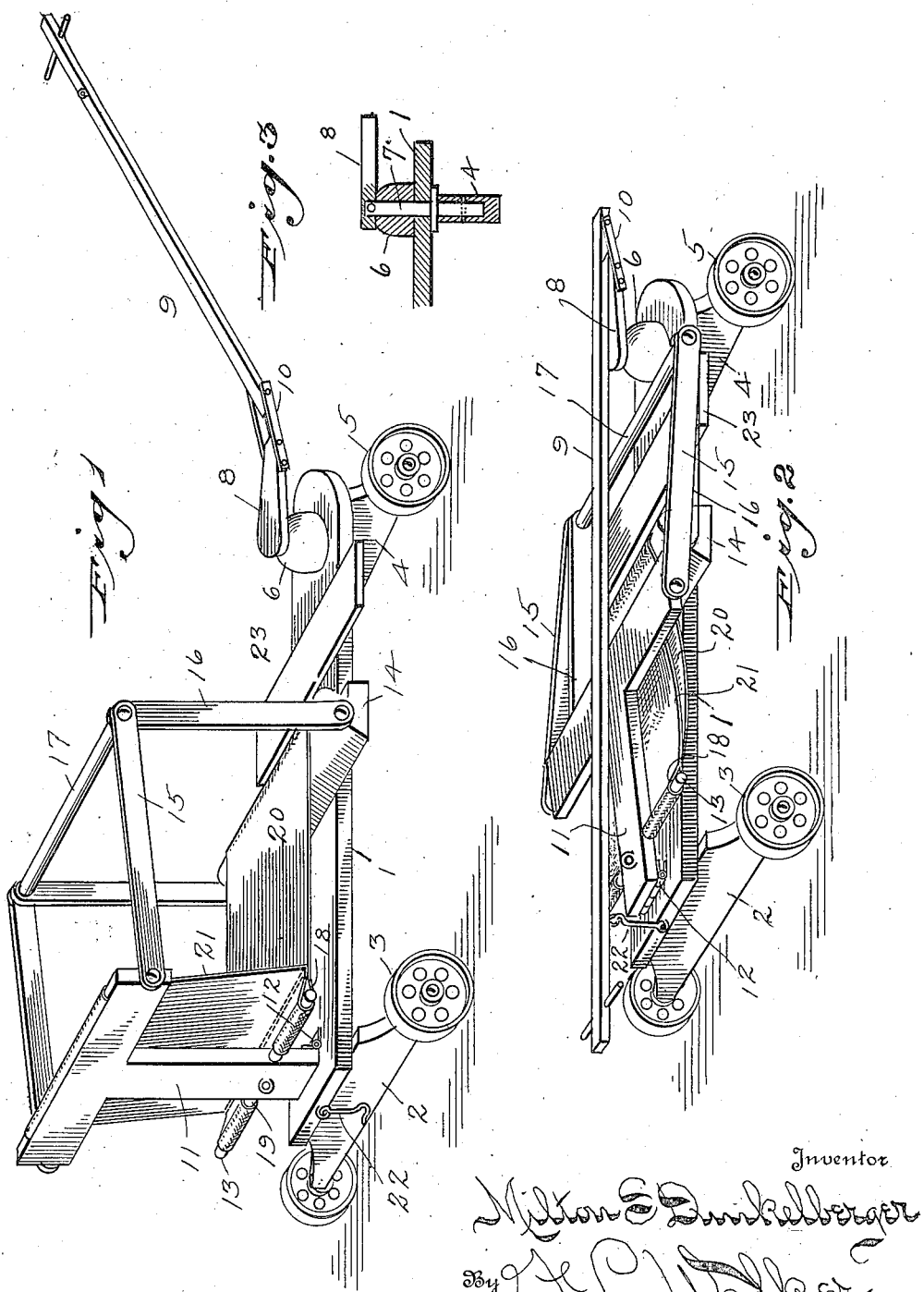
Inventor
Milton S. Dunkelberger
By F. L. Walker
Attorney Patented Aug. 14, 1923.

1,465,211

UNITED STATES PATENT OFFICE.

MILTON S. DUNKELBERGER, OF DAYTON, OHIO, ASSIGNOR, BY MESNE ASSIGNMENTS, TO THE TINY TOTER MANUFACTURING COMPANY, OF DAYTON, OHIO, A CORPORATION OF OHIO.

COLLAPSIBLE BABY CARRIAGE.

Application filed February 20, 1922. Serial No. 537,897.

*To all whom it may concern:*

Be it known that I, MILTON S. DUNKELBERGER, a citizen of the United States, residing at Dayton, in the county of Montgomery and State of Ohio, have invented certain new and useful Improvements in Collapsible Baby Carriages, of which the following is a specification.

My invention relates to hand drawn vehicles, and more particularly to a collapsible baby carriage.

The invention contemplates a hand drawn vehicle, of the wagon type, having thereon a folding or collapsible seat, provided with side arms and a retaining bar, transversely arranged across the front of the occupant, which seat frame is collapsible substantially to parallelism with the bed board of the wagon structure. When so collapsed the tongue of the vehicle is capable of being turned transversely across the collapsed seat frame and locked in such position to retain the parts in compact relation. When erect, the same locking means is employed to maintain the seat frame in upright adjustment. The seat itself is of the sling type, wherein a length of fabric forms the seat section and also a yielding back, such fabric strip being tensioned by the erection of the seat frame to afford the necessary resiliency to absorb vibration.

The object of the invention is to simplify the structure as well as the means and mode of adjusting collapsible baby carriages, whereby they will not only be cheapened in construction, but will be more efficient in use, capable of being easily and quickly collapsed to a compact form, and unlikely to get out of repair.

A further object of the invention is to provide improved means for securely locking the adjustable parts in their collapsed condition to afford a compact parcel for shipment or storage.

A further object of the invention is to provide an improved form of foldable seat frame and particularly an improved resilient seat of the sling type.

A further object of the invention is to provide an improved form of mounting for the draft tongue.

With the above primary and other incidental objects in view as will more fully appear in the specification, the invention consists of the features of construction, the parts and combinations thereof, or their equivalents as hereinafter described and set forth in the claims.

Referring to the accompanying drawings, wherein is shown the preferred, but obviously not necessarily the only form of embodiment of the invention, Fig. 1 is a perspective view of the assembled baby carriage with the seat in its upright or erect position. Fig. 2 is a similar perspective view with the seat part collapsed, and the tongue locked thereacross in reverse position. Fig. 3 is a detail sectional view.

Like parts are indicated by similar characters of reference throughout the several views.

The carriage or vehicle forming the subject matter hereof, comprises a main wagon structure consisting of the bed board 1, supported upon a rear axle or bolster 2, fixedly secured to the bed board, to which are rotatably secured rear carrying wheels 3. At the forward end, the bed board 1 is supported upon a pivoted bolster or axle portion 4, to which are rotatably secured the forward carrying wheels 5. Located on the forward end of the bed board 1, is an upwardly projecting head or boss 6, through which the king pin forming the pivotal connection of the forward axle 4, extends. To the upper end of this king pin there is fixedly connected a short arm 8, to which is hinged the draft tongue 9. The draft tongue 9 is pivoted upon a transverse axis intermediate forwardly and upwardly extending fingers 10, riveted or otherwise secured to the fixed arm 8. The construction is such that the pivotal connection of the draft tongue 9 is elevated somewhat above the plane of the bed board 1, and is located forwardly of the king pin, upon the axis of which the forward bolster or axle 4 turns.

Mounted upon the bed board 1 is a folding seat frame, comprising a seat back standard 11 of somewhat T-shape. This back standard 11 is hinged at its lower end as at 12 to the bed board 1 for forwardly and downwardly folding movement. Adjacent to its lower end but in spaced relation with the pivotal connection 12, the back standard 11 carries a cross arm or transverse rod 13, to which the rear end of the seat section is attached. Fixedly mounted upon the bed board 1, in spaced relation forward of the standard 11, is a transversely arranged seat rail 14. Side arms 15 are pivoted to the extremities of the T-shaped head of the back standard, 11, and extend forwardly therefrom, with their forward ends pivotally connected to the upper end of swinging struts 16, the lower ends of which are pivoted to the ends of the seat rail 14. A transverse retaining bar 17, connects the joints of the side arms and swinging struts, extending across the seat in front of the occupant. The seat itself consists of a strip of fabric, such as canvas or other strong, but flexible material, which is medially folded upon itself, and stitched transversely to form therein a medially disposed loop 18, which encloses the cross rod 13 of the back standard 11. The intermediate portion of this loop may be cut away as at 19, to clear the standard 11. This stitching of the loop 18 medially in the strip of fabric forms thereof two sections, a seat section 20, which extends forwardly from such loop, and has its forward end secured to the permanently attached seat rail 14, by tacking or by other means, and a second upwardly and backwardly inclined section, attached at its upper end to the cross head 8 of the back standard 11. This upwardly inclined section forms the back of the seat. The cross rod 13 of the back standard being spaced somewhat above the pivotal center of the standard will tend to move to and fro as the seat is erected or depressed. The seat loop 18 being engaged with this cross arm, the seat section 20 will be tensioned as the seat frame is adjusted to its upright or erect position. The seat frame is held erect and the section 20 under tension, by any suitable locking means as for instance the hook 22, carried upon the rear end of the bed board 1, and engaging in a suitable eye in the back standard 11. By disengaging this hook 22, the seat frame may be folded downwardly and forwardly to substantially parallel relation with the bed board 1 as shown in Fig. 2. When so collapsed the tongue is reversed to a position wherein it extends transversely across the collapsed seat frame in a fore and aft direction, as shown in Fig. 2 and is locked in such position by the same locking means or hook 22, which is otherwise employed to maintain the seat in upright adjustment The parts are thus securely held in collapsed condition for shipment or storage. A foot board 23 is preferably, though not necessarily provided, in transverse arrangement across the bed board 1, somewhat in advance of the seat rail 14.

From the above description it will be apparent that there is thus provided a device of the character described possessing the particular features of advantage before enumerated as desirable, but which obviously is susceptible of modification in its forms, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. A child's collapsible vehicle of the character described, comprising a bed board, carrying members therefor, a seat back hinged to the bed board to fold forwardly, a seat rail attached to the bed board, a fabric seat attached to the seat rail at its forward edge, a cross bar carried by the seat back at a point somewhat removed from its hinge joint, to which the rear part of the fabric seat is attached, means independent of the seat for holding the seat back in erect position whereby said seat is placed under tension by the erection of the folding seat back, and means to lock the seat back in its folded position.

2. A child's collapsible vehicle comprising a travelling main structure, a seat back hinged to the main structure to fold forwardly, a cross bar carried by the seat back in eccentric relation with its center of oscillation, a strip of fabric having therein at a mid length point a loop for engagement about said cross rod, one end of said fabric strip being attached to the wagon structure to form a seat section, the other end of the fabric strip being attached to the folding back to form a seat back, said fabric strip being placed under tension by the erection of the seat back and means independent of said fabric strip for locking the back in erect position.

3. A collapsible baby vehicle comprising a travelling main structure, a folding seat including an oscillatory back section hinged to fold downwardly and forwardly, side arms pivoted to the back section, oscillatory struts hinged to the wagon structure at their lower ends and to the side arms at their upper ends, and a cross rod connecting the opposite arms at their forward ends, the seat structure being foldable forwardly upon the wagon structure, and a tongue capable of being turned rearwardly over the folded seat structure and locked in such position to maintain the parts in collapsed condition.

4. In a collapsible baby conveyance, a vehicle structure, a folding seat structure and a tongue capable of being turned to a position wherein it will traverse the seat structure when the latter is folded and means for detachably locking the tongue in such transverse position.

5. In a collapsible vehicle, a bed board, carrying members upon which the bed board is supported, a seat rail fixed in transverse relation with the bed board, a back standard hinged to the bed board for forward folding movement, a cross rod carried by the back standard in spaced relation with its center of oscillation, a sling seat, comprising a strip of fabric attached to the seat rail at its forward end and to the cross rod at its rear, said sling seat being tensioned by the erection of the folding back standard, side arms pivoted to the back standard swinging struts pivoted to the seat rail at their lower ends and pivoted to the side arms at their upper ends, a transverse rod connecting the arm and strut joints, the seat structure being foldable by a forward and downward movement substantially to parallelism with the bed board, a tongue capable of being turned transversely across the folded seat structure and locking means engageable with the seat when erected and with the tongue when the seat is collapsed to maintain the seat in its position of adjustment.

6. In a structure of the character described, the combination of a conveyance structure and a folding seat frame mounted upon the wagon structure, of a strip of fabric folded medially upon itself and stitched in spaced relation with the fold to form an intermediate loop engageable with a movable part of the seat frame, a seat section extending forwardly therefrom and attached at its forward end to a stationary support, a back section extending upwardly and backwardly from the line of stitching and attached to a movable part of the seat frame.

In testimony whereof I have hereunto set my hand this 30th day of January A. D. 1922.

MILTON S. DUNKELBERGER.

Witnesses:
HARRY M. FILBERT,
WILLIAM A. SWANEY.